(12) United States Patent
Zhou et al.

(10) Patent No.: US 10,139,939 B2
(45) Date of Patent: Nov. 27, 2018

(54) OPTICAL TOUCH SCREEN AND DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Bozhu Zhou, Beijing (CN); Myoung Kee Baek, Beijing (CN); Xianxue Duan, Beijing (CN); Cheng Chen, Beijing (CN); Chengshao Yang, Beijing (CN); Binbin Cao, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/436,020

(22) PCT Filed: Jul. 17, 2014

(86) PCT No.: PCT/CN2014/082422
§ 371 (c)(1),
(2) Date: Apr. 15, 2015

(87) PCT Pub. No.: WO2015/043293
PCT Pub. Date: Apr. 2, 2015

(65) Prior Publication Data
US 2015/0277641 A1 Oct. 1, 2015

(30) Foreign Application Priority Data
Sep. 30, 2013 (CN) .......................... 2013 1 0463669

(51) Int. Cl.
*G06F 3/041* (2006.01)
*G06F 1/16* (2006.01)
(Continued)

(52) U.S. Cl.
CPC ............. *G06F 3/0412* (2013.01); *G02B 6/00* (2013.01); *G06F 1/16* (2013.01); *G06F 3/0421* (2013.01);
(Continued)

(58) Field of Classification Search
None
See application file for complete search history.

(56) References Cited

U.S. PATENT DOCUMENTS

| | | | |
|---|---|---|---|
| 5,525,380 A * | 6/1996 | Paz-Pujalt | C09K 11/7772 427/162 |
| 2005/0052435 A1 * | 3/2005 | Cho | G02F 1/1354 345/182 |

(Continued)

FOREIGN PATENT DOCUMENTS

| CN | 102004339 A | 4/2011 |
|---|---|---|
| CN | 102043547 A | 5/2011 |

(Continued)

OTHER PUBLICATIONS

First Chinese Office Action dated Dec. 29, 2015; Appln. No. 201310463669.X.

(Continued)

*Primary Examiner* — Joseph Haley
(74) *Attorney, Agent, or Firm* — Ladas & Parry LLP

(57) ABSTRACT

An optical touch screen and a display device are disclosed. The optical touch screen (200) comprises an optical touch panel (210) and a first sensor (220) and a second sensor (230). The optical touch panel (210) comprises a first optical transmission channel (211) and a second optical transmission channel (212) which are intersected with each other. The first sensor (220) is disposed on at least one end of the first optical transmission channel (211) and configured to receive light emitted by the first optical transmission channel (211). The second sensor (230) is disposed on at least one end of the second optical transmission channel (212) and (Continued)

configured to receive light emitted by the second optical transmission channel (212). The optical touch screen and the display device can improve the positioning accuracy of the touch position.

19 Claims, 4 Drawing Sheets

(51) Int. Cl.
*G06F 3/042* (2006.01)
*G02B 6/00* (2006.01)
*G06F 3/038* (2013.01)

(52) U.S. Cl.
CPC .......... *G06F 3/0428* (2013.01); *G06F 3/0386* (2013.01); *G06F 2203/04109* (2013.01)

(56) References Cited

U.S. PATENT DOCUMENTS

| | | | | |
|---|---|---|---|---|
| 2010/0171717 | A1* | 7/2010 | Hu | G06F 3/0386 345/173 |
| 2011/0063206 | A1* | 3/2011 | Karaoguz | G06F 3/0304 345/156 |
| 2011/0163995 | A1* | 7/2011 | Su | G06F 3/0421 345/175 |
| 2011/0254809 | A1 | 10/2011 | Yu et al. | |
| 2011/0266423 | A1* | 11/2011 | Koeppe | G06F 3/03542 250/227.31 |
| 2012/0019462 | A1* | 1/2012 | Kim | G06F 3/0386 345/173 |

FOREIGN PATENT DOCUMENTS

| | | |
|---|---|---|
| CN | 103500042 A | 1/2014 |
| CN | 203455808 U | 2/2014 |
| DE | 351130 C2 | 5/1988 |
| JP | 2010-014512 A | 1/2010 |

OTHER PUBLICATIONS

International Search Report Appln. No. PCT/CN2014/082422; dated Oct. 24, 2015.

Written Opinion of the International Searching Authority Appln. No. PCT/CN2014/082422; dated Oct. 24, 2014.

Second Chinese Office Action dated Jun. 8, 2016; Appln. No. 201310463669.X.

* cited by examiner

OPTICAL TOUCH SCREEN AND DISPLAY DEVICE

TECHNICAL FIELD

At least one embodiment of the present invention provides an optical touch screen and a display device.

BACKGROUND

With the widespread application of the touch technology and the display technology, more and more people have access to touch screens. Touch screens have many advantages such as easy communication. Users can operate a computer only by using a finger to gently touch icons or text displayed on display screens of computers, and hence human-computer interaction can become more straightforward. Thus, the touch technology greatly facilitates the interactive dialogue between the user and the display screen.

In general, a touch screen is an input device for replacing a keyboard and a mouse. The input device mainly comprises a touch panel attached to a monitor, a controller, a device driver and applications. The touch panel is formed by an indium tin oxide (ITO) glass sheet or an ITO film which is specially processed and configured to sense signals inputted by users. When the surface of the touch panel is touched by a hand or a touch pen, a position identification sensor senses the touch position on the touch panel. As the hand or the touch pen directly contacts the touch panel, fingerprints are left on the surface of the touch panel or scratches are produced, and hence the service life of the display screen can be disadvantageously affected. Moreover, in some special applications, e.g., the public places such as stations, airports and shopping malls, where large-size displays are used, the display cannot be directly contacted in a short distance, and hence the application of the touch screen can be limitative.

A technology as learned by the inventors provides an optical touch screen capable of avoiding the direct contact of a display and controlling the display in a long distance. As illustrated in FIG. 1, the optical touch screen 100 comprises an optical touch panel 110 and two sensors 120 and 130, the optical touch panel 110 comprises an infrared phosphor material capable of emitting light when exposed to the infrared light; and the two sensors 120 and 130 are respectively disposed at different corners of the optical touch panel 110. When light is emitted from areas irradiated by the infrared light on the optical touch panel 110, the two sensors 120 and 130 receive the emitted light respectively, and the luminous position is detected and positioned by triangulation.

SUMMARY

Embodiments of the present invention provide an optical touch screen and a display device which can improve the positioning accuracy of the touch position.

At least one embodiment of the present invention provides an optical touch screen, which comprises an optical touch panel, a first sensor and a second sensor. The optical touch panel comprises a first optical transmission channel and a second optical transmission channel which are intersected with each other. The first sensor is disposed on at least one end of the first optical transmission channel and configured to receive light emitted by the first optical transmission channel. The second sensor is disposed on at least one end of the second optical transmission channel and configured to receive light emitted by the second optical transmission channel.

At least another embodiment of the present invention further provides a display device, which comprises the optical touch screen.

BRIEF DESCRIPTION OF THE DRAWINGS

Simple description will be given below to the accompanying drawings of the embodiments to provide a more clear understanding of the technical proposals of the embodiments of the present invention. It will be obvious to those skilled in the art that the drawings described below only involve some embodiments of the present invention but are not intended to limit the present invention.

Figure 1:
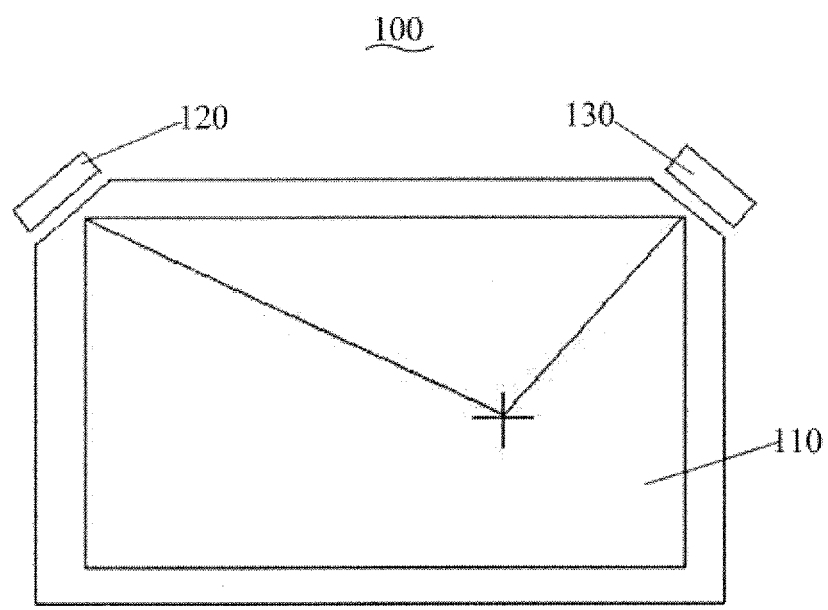
FIG. 1 is a schematic structural view of an optical touch screen.

Reference numerals of the accompanying drawings:
100—Optical Touch Screen, 110—Optical Touch Panel, 120, 130—Sensor, 200, 300—Optical Touch Screen, 210, 310—Optical Touch Panel, 211, 311—First Optical Transmission Channel, 212, 312—Second Optical Transmission Channel, 213—First Transparent Substrate, 214—Second Transparent Substrate, 220—First Sensor, 230—Second Sensor, 310—Optical Touch Panel, 320—First Sensor, 330—Second Sensor, 340—Display Body.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. It will be obvious to those skilled in the art that the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Unless otherwise specified, the technical terms or scientific terms used in the present invention have normal meanings understood by those skilled in the art. The words "first", "second" and the like used in the present invention do not indicate the sequence, the number or the importance but are only used for distinguishing different components. Similarly, the words "a", "an", "the" and the like also do not indicate the number but only indicate at least one. The word "comprise", "include" or the like only indicates that an element or a component before the word contains elements or components listed after the word and equivalents thereof, not excluding other elements or components. The words "connection", "connected" and the like are not limited to physical or mechanical connection but may include electrical connection, either directly or indirectly. The words "on", "beneath", "left", "right" and the like only indicate the relative position relationship which is correspondingly changed when the absolute position of a described object is changed.

The inventors note that the optical touch screen as shown in FIG. 1 determining the position of a luminous point by triangulation, the positions on the display plane and the measured angles are not in a linear relationship, and hence the positioning accuracy of the touch position can be disadvantageously affected.

Figure 2:
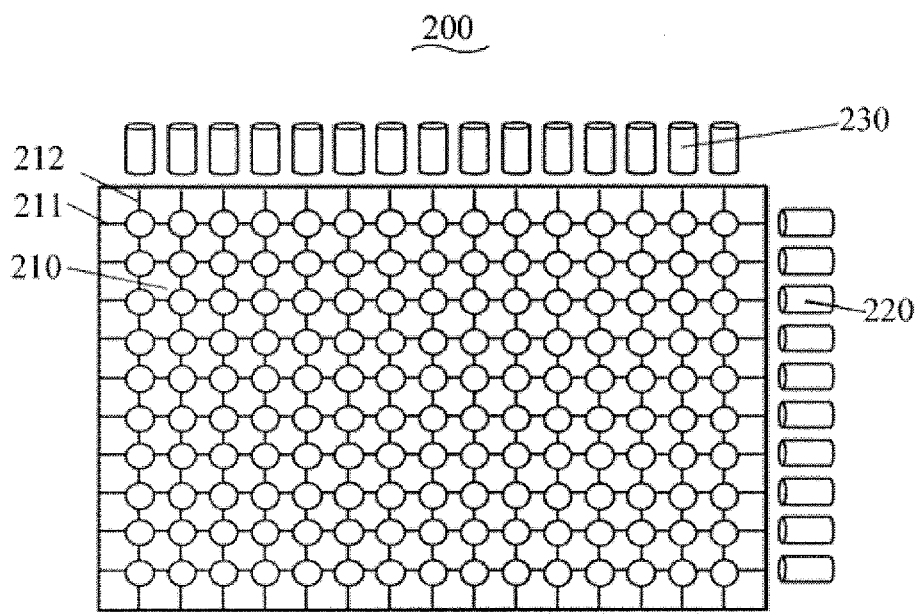
FIG. 2 is a schematic structural view of an optical touch screen provided by one embodiment of the present invention.
Figure 8:
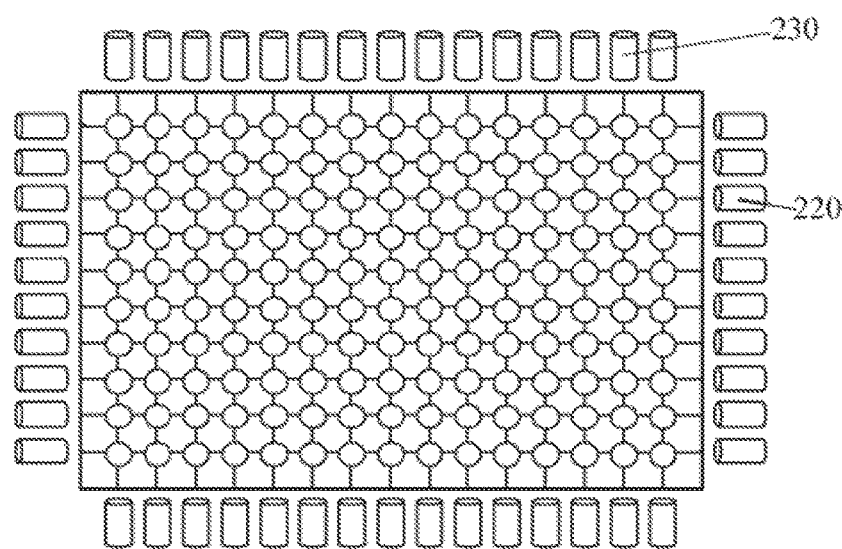
FIG. 8 is a schematic structural view of an optical touch screen provided by another embodiment of the present invention.

FIG. 2 is a schematic structural view of an optical touch screen 200 provided by an embodiment of the present invention. The optical touch screen 200 provided by the embodiment of the present invention comprises an optical touch panel 210 which is provided with first optical transmission channels 211 and second optical transmission channels 212. The optical touch screen 200 further comprises first sensors 220 and second sensors 230. The first sensors 220 are disposed on at least one end of the first optical transmission channels 211 and configured to receive light emitted by the first optical transmission channels 211. The second sensors 230 are disposed on at least one end of the second optical transmission channels 212 and configured to receive light emitted by the second optical transmission channels 212. The first sensors 220 and the second sensors 230 may be disposed on the outside of the optical touch panel 210 or may be disposed on the optical touch panel 210. In addition, the first sensors 220 and the second sensors 230 may be disposed at one end or two ends of corresponding optical transmission channels thereof. In addition, in the embodiment shown in FIG. 8, one first sensor is disposed on each end of each first optical transmission channel and one second sensor is disposed on each end of each second optical transmission channel. As illustrated in FIG. 2, the first optical transmission channels 211 and the second optical transmission channels 212 are intersected with each other, and for instance, may be orthogonal to each other. The first optical transmission channels 211 and the second optical transmission channels 212 may also be not orthogonal to each other as required. Moreover, as illustrated in FIG. 2, the optical touch panel 210 comprises a plurality of first optical transmission channels 211, a plurality of second optical transmission channels 212, a plurality of first sensors 220 and a plurality of second sensors 230. The plurality of first sensors 220 are in one-to-one correspondence with the plurality of first optical transmission channels 211 and the plurality of second sensors 230 are in one-to-one correspondence with the plurality of second optical transmission channels 212. The first sensors 220 and the second sensors 230 may be optical sensors configured to convert optical signals into electrical signals, and for instance, may be photodiodes or infrared sensors.

Each of the intersection points between the first optical transmission channels 211 and the second optical transmission channels 212 may be taken as a luminous position, which is equivalent to form a rectangular coordinate system on the touch panel. After a position on the optical touch screen 200 is irradiated by light, light emitted from the position can be emitted along the first optical transmission channel(s) 211 and the second optical transmission channel(s) 212 at the same time, and optical signals are respectively detected by the first sensor(s) 220 and the second sensor(s) 230, and hence the coordinate of the luminous position can be determined. Thus, the positions on the touch panel and the measured coordinate are in a linear relationship, and hence the positioning accuracy of the touch position can be improved.

Figure 3:
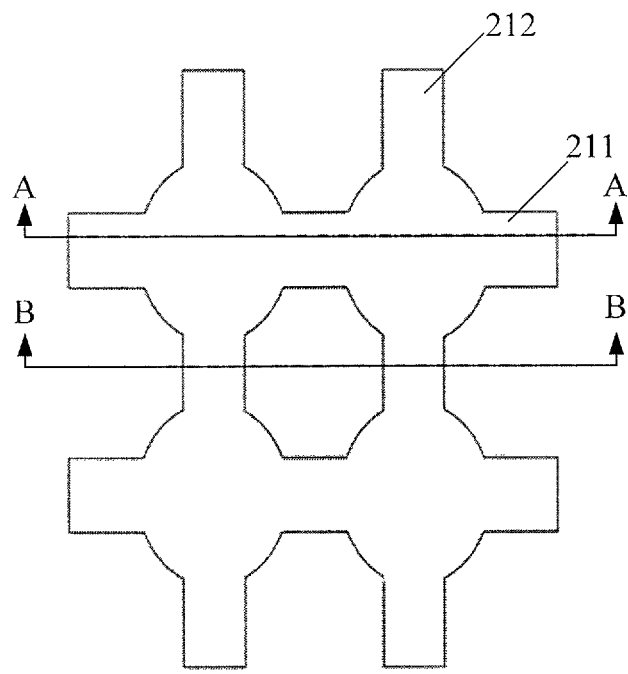
FIG. 3 is a partial enlarged view of an optical touch panel in FIG. 2.

When the optical touch screen 200 provided by at least one embodiment of the present invention is applied in an actual product, the first optical transmission channels 211 and the second optical transmission channels 212 are closely arranged on the optical touch panel (correspondingly, the first sensors 220 and the second sensors 230 are closely arranged and may also be disposed on the circumference of the optical touch panel), and orthogonal points of the first optical transmission channels 211 and the second optical transmission channels 212 are very small in size. FIG. 3 is a partial enlarged view of an optical touch panel in FIG. 2. The figure is only intended to facilitate the understanding of readers but not intended to limit the embodiments of the present invention. When a light source irradiates the optical touch panel 210, the center of an illuminated area of the optical touch panel 210 just falls on a certain orthogonal point or a plurality of orthogonal points or is deviated from the orthogonal point. But in either case, the illuminated area on the optical touch panel will cover the specific orthogonal point. The first optical transmission channels 211 and the second optical transmission channels 212 have the function of concentrating and guiding light. Thus, the light emitted from the orthogonal point is propagated along the first optical transmission channel(s) 211 and the second optical transmission channel(s) 212 at the same time. Finally, optical signals are respectively detected by the first sensor 220 and the second sensor 230 corresponding to the channels, and hence the coordinate of the luminous position can be determined.

Figure 6:
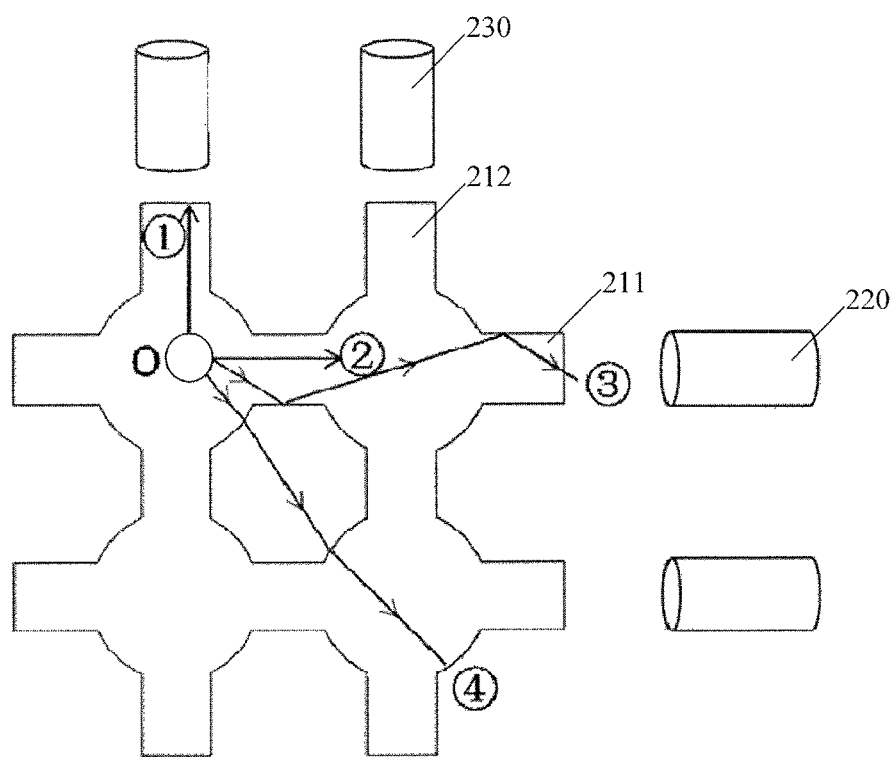
FIG. 6 is a schematic diagram illustrating the propagation path of light of an optical touch screen provided by still another embodiment of the present invention.

Of course, the propagation path of light in the optical touch panel is not limited to the two paths. For the convenience of description, as illustrated in FIG. 6, the first optical transmission channels 211 are disposed in the X direction, and the horizontally rightward direction in the figure is the main X direction; the second optical transmission channels 212 are disposed in the Y direction, and the vertically upward direction in the figure is the main Y direction; and any orthogonal point between a first optical transmission channel 211 and a second optical transmission channel 212 can be set as O point. The propagation path of light is mainly divided into four optical paths which are respectively indicated with □, □, □ and □ in FIG. 6, wherein □ refers to the optical transmission channel in the main Y direction; □ refers to the optical transmission channel in the main X direction; □ refers to the optical transmission channel in the secondary X direction; and □ refers to the optical transmission channel in the non-detection direction.

When any luminous point O is excited, light emitted after excitation will be propagated along all directions on the circumference, most of the light is propagated along the main directions of the optical transmission channels, e.g., the optical propagation paths □ and □, so that light in the X and Y directions is received by the sensors; and in the secondary direction of the optical transmission channel, e.g., the optical path □, light is reflected (including total reflection) and propagated in the transmission channel and finally received by the sensor. In other directions, e.g., the optical path □, light is mainly refracted and propagated; the propagation path is relatively long and the optical loss is relatively large; and finally, the light may not be detected by any sensor. However, the light in the optical path □ may finally enter a specific sensor and be detected. But in this case, the light intensity of the optical transmission channel in the non-detection direction is much smaller than the light intensity of the main optical transmission channel of the luminous point (the light intensity of the main optical transmission channel is the sum of the light intensity of the optical transmission channel in the primary direction and the secondary direction).

In order to prevent the light in the non-detection direction (e.g., the optical path □) from affecting the determination of the luminous position, for instance, a light intensity threshold may be set for the sensor, and hence the interference of the non-detection direction can be eliminated. That is to say, a first light intensity threshold is set for the first sensor 220 and used for comparison with the light intensity of the first sensor 220, and a second light intensity threshold is set for the second sensor 230 and used for comparison with the light intensity of the second sensor 230.

It should be understood that, after the first sensor 220 and the second sensor 230 detect the optical signal, the light intensity of the optical signal may be determined and processed by, for instance, a central processing unit (CPU) (one example of a controller), and the position of the luminous point is determined by calculation. For instance, when the CPU determines that the light intensity of the first sensor 220 is greater than or equal to the first light intensity threshold, the position of the luminous point in the Y direction is determined by calculation; when the light intensity of the first sensor 220 is less than the first light intensity threshold, further calculation is not conducted; when the CPU determines that the light intensity of the second sensor 230 is greater than or equal to the second light intensity threshold, the position of the luminous point in the X direction is determined by calculation; and when the light intensity of the second sensor 230 is less than the second light intensity threshold, further calculation is not conducted.

In summary, when the CPU determines that the light intensity (e.g., the light intensity of the transmission channels in the X and Y directions) reaches the specified light intensity threshold, the coordinate of the luminous position is determined by calculation; and when the CPU determines that the light intensity (e.g., the light intensity in the non-detection direction) does not reach the specified light intensity threshold, further calculation is not conducted, so that the interference of ambient light (e.g., the light in the non-detection direction) can be effectively eliminated, and hence the luminous position can be accurately calculated.

The light source has various types, and different types of light sources require different light intensity thresholds. In addition, different products have different applications. Thus, the specific value range of the first light intensity threshold and the second light intensity threshold should be elected according to actual applications. No specific limitation will be given here.

The optical touch panel 110 in FIG. 1 adopts an infrared phosphor material to achieve the long-distance control of the display. The material is excited by an invisible infrared laser. But in the external environment, a large quantity of objects, particularly high-temperature objects, can emit infrared light. Moreover, the infrared light has no visibility. Thus, the error touch of the optical touch panel 110 tends to occur, which is not friendly to actual application. At least one embodiment of the present invention adopts up-conversion luminescent materials to achieve the long-distance control of the display. The up-conversion luminescent material can be excited by visible light. Moreover, the visible light not only can be easily acquired (for instance, by a commonly used laser pointer) in an actual application but also has visibility. Thus, the error touch of the optical touch panel 210 can be avoided.

The first optical transmission channel 211 and the second optical transmission channel 212 may be formed by the up-conversion luminescent material via, for instance, an etching process or other patterning processes, and a transparent substrate is adopted as a basic substrate for the up-conversion luminescent material.

The light-emitting principle of the up-conversion luminescent material is Anti-Stokes rule, namely light with long wavelength excites light with short wavelength. For instance, infrared light excites visible light; red light excites yellow light; or visible light excites ultraviolet light. The up-conversion luminescence process of the material generally may occur in compounds doped with rare earth ions, which mainly include fluorides, oxides, sulfur-containing compounds, fluorine oxide, halide or the like or combinations thereof. Currently, the up-conversion luminescent material has the function of absorbing light with the wavelength of 600 to 1,100 nm and producing visible light such as red light, green light or blue light by up-conversion excitation.

According to the light-emitting principle of the up-conversion luminescent material, the touch light source in at least one embodiment of the present invention adopts visible light. The up-conversion luminescent material stated above will emit visible light or invisible light when exposed to visible light. The wavelength of visible light capable of being absorbed by the up-conversion luminescent material is determined by the type of the material. Herein, the optional proposal of the embodiment of the present invention is that: the up-conversion luminescent material absorbs orange light with the wavelength of 618 nm. After the up-conversion luminescent material absorbs the orange light with the wavelength of 618 nm, blue light with the wavelength of 487 nm can be excited by up-conversion.

Figure 4:
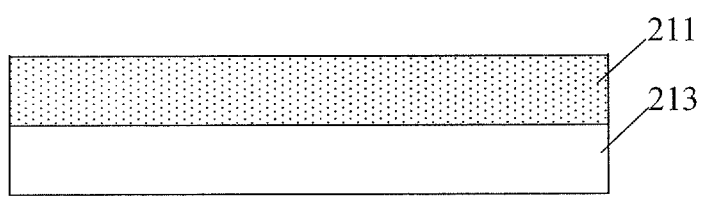
FIG. 4 is a sectional view of an optical touch panel provided by another embodiment of the present invention, along the A-A direction in FIG. 3.

As for the optical touch panel 210, as illustrated in FIG. 4, in another embodiment of the present invention, the optical touch panel 210 may include a first substrate, for instance, a first transparent substrate 213. The first transparent substrate 213 is provided with an up-conversion luminescent material thereon, and a first optical transmission channel 211 and a second optical transmission channel (not shown in the figure) are formed on the first transparent substrate 213 by, for instance, an etching process or other patterning processes.

Figure 5:
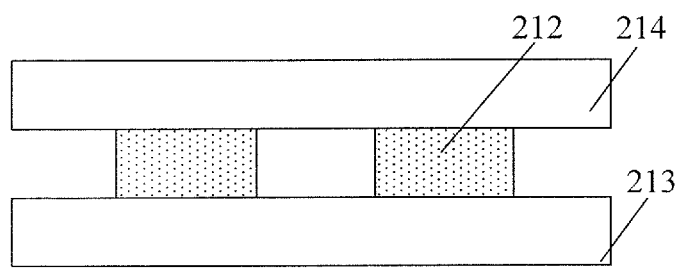
FIG. 5 is a sectional view of an optical touch panel provided by still another embodiment of the present invention, along the B-B direction in FIG. 3.

As illustrated in FIG. 5, in still another embodiment of the present invention, the optical touch panel 210 may also have a structure similar to a sandwich. The upper layer and the lower layer are respectively a second substrate and a first substrate, for instance, a second transparent substrate 214 and a first transparent substrate 213. The intermediate layer is provided with the up-conversion luminescent material. First optical transmission channels (not shown in FIG. 5) and second optical transmission channels 212 are formed on the first transparent substrate 213 by the up-conversion luminescent material in the intermediate layer via, for instance, an etching process or other patterning processes. The sandwich structure can have the function of protecting the up-conversion luminescent material and prevent the up-conversion luminescent material from contacting the external environment.

In at least one embodiment of the present invention, both the first transparent substrate 213 and the second transparent substrate 214 may comprise glass or may comprise resin, or one comprises glass and the other comprises resin. The space, beside the first optical transmission channels 211 and the second optical transmission channels 212, between the first transparent substrate 213 and the second transparent substrate 214, for instance, may also be filled with a protective layer which is configured to protect the up-conversion luminescent material and prevent the up-conversion luminescent materials from being damaged.

In at least one embodiment of the present invention, the protective layer, for instance, may be of vacuum and may also be of inactive gas, e.g., inert gas (helium, neon, argon, krypton, xenon and radon) and nitrogen which do not react with the up-conversion luminescent materials.

The first transparent substrate 213 and the second transparent substrate 214 do not react with visible light. Thus, the visible light can directly run through the transparent substrates and be incident into the up-conversion luminescent materials, which will not affect the touch of the optical touch panel 210.

Figure 7:
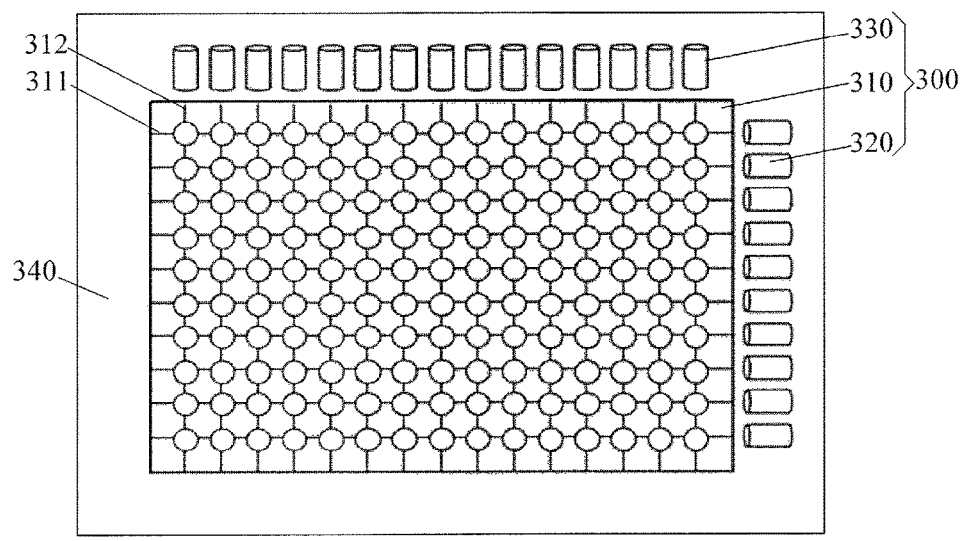
FIG. 7 is a schematic diagram of a display device provided by still another embodiment of the present inventions.

At least one embodiment of the present invention further provides a display device, which, as illustrated in FIG. 7, comprises a display body 340 and an optical touch screen 300 disposed on a display side of the display body 340. The optical touch screen 300 comprises an optical touch panel 310, at least one first sensor 320 and at least one second sensor 330. The optical touch panel 310 is mounted in the display body 340. The at least one first sensor 320 and the at least one second sensor 330 are, for instance, interposed between the display body 340 and the optical touch panel 310. The optical touch panel 310 is provided with a plurality of first optical transmission channels 311 and a plurality of second optical transmission channels 312 which are, for instance, orthogonal to each other. The at least one first sensor 320 is disposed at one end of the first optical transmission channel 311 and configured to receive light emitted by the first optical transmission channel 311. The at least one second sensor 330 is disposed at one end of the second optical transmission channel 312 and configured to receive light emitted by the second optical transmission channel 312.

In the case as shown in FIG. 7, the first optical transmission channels 311 and the second optical transmission channels 312 are orthogonal to each other. Each of the intersection points of the first optical transmission channels 311 and the second optical transmission channels 312 may be taken as a luminous position, which is equivalent to a rectangular coordinate system on the touch panel. After a specific position on the optical touch panel 210 is irradiated by light, light emitted from the position may be emitted along the first optical transmission channel(s) 311 and the second optical transmission channel(s) 312 at the same time, and optical signals are respectively detected by the first sensor 320 and the second sensor 330, and hence the coordinate of the luminous position can be determined. Thus, the positions on the touch panel and the measured coordinate are in a linear relationship, and hence the positioning accuracy of the touch position can be improved.

The display body 340 may be a display device of any type, for instance, a liquid crystal display (LCD) device, an organic light-emitting diode (OLED) display device, an inorganic diode display device, a plasma display device and a cathode ray tube (CRT) device.

As the preferred embodiments of the optical touch screen 300 have been described above in detail, no further description will be given here.

In at least one embodiment of the present invention, the first optical transmission channels 311 and the second optical transmission channels 312 comprise an up-conversion luminescent material. When visible laser is emitted to the optical touch panel 310 by a user through a laser pointer at a position away from the display device, light is incident into the up-conversion material and is converted into visible light or invisible light by excitation; the light is propagated along the transmission channels in the X and Y directions; optical signals are detected by the first sensor 320 and the second sensor 330 and hence calculated and processed by, for instance, a CPU; and hence the luminous position of the optical touch panel 310 can be obtained.

In at least one embodiment of the present invention, the means of one first sensor and one second sensor may be adopted. For instance, the first sensor and the second sensor adopt a sensor with a position identification function.

The foregoing is only the preferred embodiments of the present invention, but the scope of protection of the present invention is not limited thereto. Any change or replacement easily made by those skilled in the art within the technical scope disclosed by the present invention shall fall within the scope of protection of the present invention. Thus, the scope of protection of the present invention shall be defined by the appended claims.

The application claims priority to the Chinese patent application No. 201310463669.X submitted on Sep. 30, 2013. The disclosure content of the Chinese patent application is incorporated by reference herein as part of the application.

The invention claimed is:

1. An optical touch screen, comprising:
an optical touch panel, wherein the optical touch panel comprises a plurality of first optical transmission channels and a plurality of second optical transmission channels, the plurality of second optical transmission channels are intersected with the plurality of first optical transmission channels with intersection points of the first optical transmission channels and the second optical transmission channels being of an enlarged circular shape, each of the first optical transmission channel has a first end and a second end, and each of the second optical transmission channel has a first end and a second end; and
a plurality of first sensors and a plurality of second sensors, the plurality of first sensors are positioned such that there is one first sensor disposed on the first end of each first optical transmission channel and there is one first sensor disposed on the second end of each first optical transmission channel and the first sensors are configured to receive light emitted by respective first optical transmission channel; and the plurality of second sensors are positioned such that there is one second sensor disposed on the first end of each second optical transmission channel and there is one second sensor disposed on the second end of each second optical transmission channel and the second sensors are configured to receive light emitted by respective second optical transmission channel, wherein after a position on the optical touch screen is irradiated by a light, light emitted from the position can travel along the first and second optical transmission channels, and optical signals are respectively detected by the first and second sensors and hence the position can be determined, wherein each of the first optical transmission channels is entirely formed of an up-conversion luminescent material, and each of the entire second optical transmission channels is entirely formed of an up-conversion luminescent material.

2. The optical touch screen according to claim 1, wherein the up-conversion luminescent material emits visible light or invisible light when exposed to visible light.

3. The optical touch screen according to claim 1, wherein a first light intensity threshold is set for the first sensor; and a second light intensity threshold is set for the second sensor.

4. The optical touch screen according to claim 1, wherein the optical touch panel further comprises a first substrate which is provided with the first optical transmission channels and the second optical transmission channels thereon.

5. The optical touch screen according to claim 4, wherein the optical touch panel further comprises a second substrate; and the first optical transmission channels and the second optical transmission channels are disposed between the first substrate and the second substrate.

6. The optical touch screen according to claim 5, wherein a space, beside the first optical transmission channels and the second optical transmission channels, between the first substrate and the second substrate is filled with a protective layer.

7. The optical touch screen according to claim 6, wherein the protective layer is vacuum or inactive gas.

8. The optical touch screen according to claim 5, wherein the first substrate and/or the second substrate is a transparent substrate.

9. The optical touch screen according to claim 5, wherein the first substrate and the second substrate comprise glass or resin.

10. The optical touch screen according to claim 1, wherein the first sensor and/or the second sensor is an optical sensor.

11. The optical touch screen according to claim 10, wherein the optical sensor is a photodiode or an infrared sensor.

12. A display device, comprising the optical touch screen according to claim 1.

13. The optical touch screen according to claim 3, wherein the optical touch panel further comprises a first substrate which is provided with the first optical transmission channels and the second optical transmission channels thereon.

14. The optical touch screen according to claim 13, wherein the optical touch panel further comprises a second substrate; and the first optical transmission channels and the second optical transmission channels are disposed between the first substrate and the second substrate.

15. The optical touch screen according to claim 14, wherein a space, beside the first optical transmission channels and the second optical transmission channels, between the first substrate and the second substrate is filled with a protective layer.

16. The optical touch screen according to claim 15, wherein the protective layer is vacuum or inactive gas.

17. The optical touch screen according to claim 14, wherein the first substrate and/or the second substrate is a transparent substrate.

18. The optical touch screen according to claim 14, wherein the first substrate and the second substrate comprise glass or resin.

19. The optical touch screen according to claim 1, wherein a first light intensity threshold is set for the first sensor; and a second light intensity threshold is set for the second sensor.

* * * * *